J. P. CRUISE.
COTTON PICKER.
APPLICATION FILED JUNE 19, 1919.
1,374,827.
Patented Apr. 12, 1921.
2 SHEETS—SHEET 1.
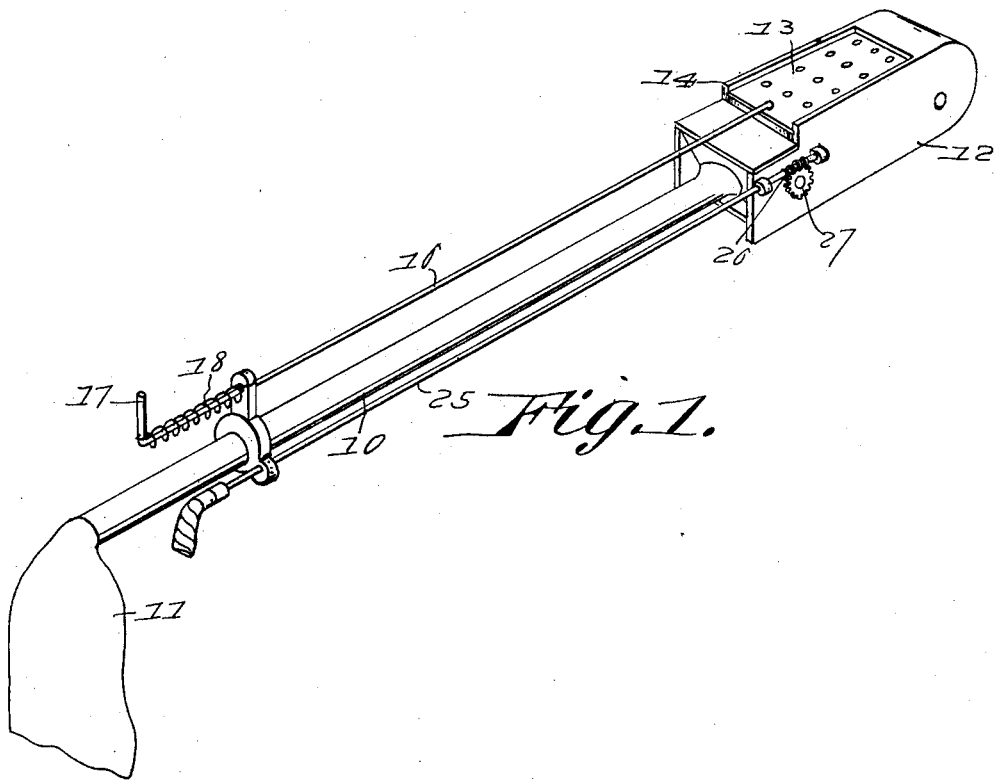
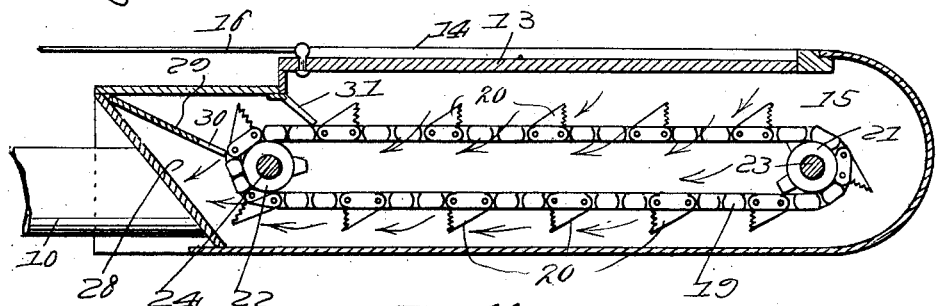
Inventor
J. P. Cruise,
By
Attorney J. P. CRUISE.
COTTON PICKER.
APPLICATION FILED JUNE 19, 1919.
1,374,827.
Patented Apr. 12, 1921.
2 SHEETS—SHEET 2.
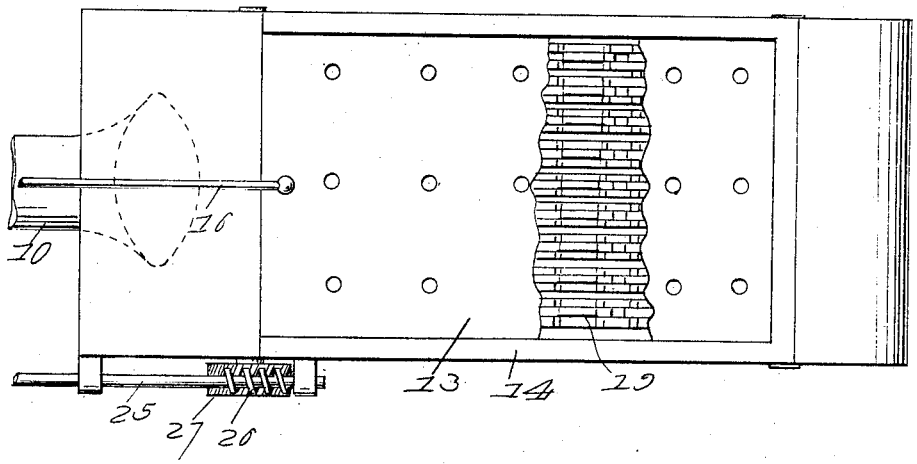
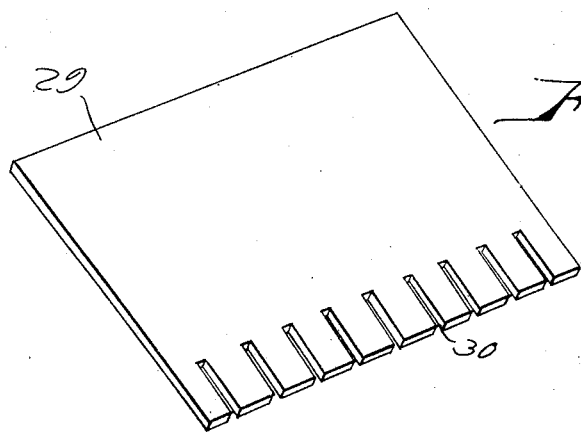

UNITED STATES PATENT OFFICE.

JAMES P. CRUISE, OF CARPENTER, MISSISSIPPI.

COTTON-PICKER.

1,374,827.   Specification of Letters Patent.   Patented Apr. 12, 1921.

Application filed June 19, 1919. Serial No. 305,280.

*To all whom it may concern:*

Be it known that I, JAMES P. CRUISE, a citizen of the United States of America, residing at Carpenter, in the county of Copiah and State of Mississippi, have invented new and useful Improvements in Cotton-Pickers, of which the following is a specification.

The object of the invention is to provide a simple and convenient portable cotton picker adapted to be used under conditions permitting of the removal of the cotton from the bolls with the minimum accumulation of foreign matter, such as leaves and portions of the bolls and yet with a view to economical and reasonably thorough harvesting of the crop with the minimum of effort upon the part of the operator and to that end the invention consists in the construction and combination of elements illustrated in the accompanying drawings, it being understood that changes in form, proportion and details may be resorted to, within the scope of the claims without departing from the principles involved.

In the drawings:

Figure 1 is a perspective view of a cotton harvesting nozzle embodying the invention.

Fig. 2 is a longitudinal sectional view of the same.

Fig. 3 is a plan view with the cover plate partly broken away.

Fig. 4 is a detail view of the guard plate or reflector.

The apparatus consists essentially of a nozzle having a tube 10 adapted to be connected to a sack or receptacle 11 and terminating in a hollow head 12 consisting of a box provided with a removable cover plate 13 preferably mounted to slide in suitable guides 14 so as to expose the interior of the head within which is arranged the stripper 15. Connected with the cover is an operating rod 16 having a handle 17 arranged within convenient reach of the operator, the lid being yieldingly held closed by means of a spring 18 connected with the rod so that upon its release the head will be closed in moving the apparatus from one cotton boll to another to prevent the introduction of foreign matter or trash by reason of a suction mouth in the head through the tube.

The stripper is preferably of a plurality of parallel endless chains 19, the stripper having serrated plates and rings 20, said chains being carried by sprocket wheels 21, 22 on the transverse spindles 23 and 24 mounted in the box and movement is imparted to the carriers through the sprocket wheels by a rod 25 geared to the spindle 24 of one set of sprockets as by a worm 26 meshing with a worm gear 27.

Laid adjacent to the inlet end or mouth 28 of the suction tube 10 which is preferably inclined or diagonally disposed with reference to the length of the head and the line of movement of the carrier, is an inclined deflector plate or guard 29 having on its free edge slots 30 through which the plates or wings 20 of the stripper move, and a second deflector or guard 31 may be correspondingly disposed adjacent to the opening fitted with the cover 13. The side of the carrier which is adjacent to the plane of the opening in the casing is designed to move operatively from the suction inlet 28 toward the opposite extremity of the casing while the effect of the suction applied as described to one end of the casing with the carrier afforded by the deflector 29 between the same and the opening is to cause the current of air introduced within the head to pass through the carrier and thus hold the fibers of cotton on the carrier until they reach the end adjacent to the suction opening 28. Such portion of the cotton as is not removed from the carrier by the suction at the end adjacent to the outlet 28 is detached by reason of the position of the plate.

In practice the device as described will remove the cotton from the bolls without mutilating the hulls or husks of the latter and as the head may be closed as soon as the operation upon a boll has been completed, and while moving the head from operative relation with one boll to another, the possibility of the machine accumulating foreign material in its operation is reduced to the minimum and the grade of the product is maintained at a high standard without special effort upon the part of the operator and without involving the use of complicated mechanisms hereinbefore deemed necessary in this connection.

The invention having been described, what is claimed as new and useful is:

1. A cotton harvesting nozzle having a suction tube and a communicating hollow head provided with an inlet opening, a slide closure for said opening and yielding means for retaining the same in its closed position, and cotton picking devices mounted within the head.

2. A cotton harvesting nozzle having a suction tube and an elongated hollow head in communication therewith and provided with a side inlet opening, the mouth of the suction tube being diagonally disposed with reference to the plane of said inlet opening, cotton picking devices consisting of an endless carrier mounted for movement in the head between said suction mouth and inlet opening and parallel with the plane of the latter and provided with serrated plates or wings, and means for operating said carrier.

3. A cotton harvesting nozzle having a suction tube and a hollow head in communication therewith and provided with a side inlet opening, cotton picking devices mounted in the head and consisting of an endless carrier provided with serrated plates or wings for movement toward and from the communicating end of the suction tube, a deflector plate disposed adjacent to the inlet end of the suction tube and slotted to permit of the passage of said plates or wings and means for communicating motion to the carrier.

4. A cotton harvesting nozzle having a suction tube and a communicating hollow head having a side inlet opening, cotton picking devices mounted within the head comprising an endless carrier consisting of endless chains and sprocket wheels and serrated plates or wings attached to said chains, inclined deflector plates or guards disposed in the head in operative relation with said carrier and having slots for the passage therethrough of said plates or wings, and means for communicating motion to said carrier.

In testimony whereof I affix my signature.

JAMES P. CRUISE.